(12) United States Patent
Laffin

(10) Patent No.: US 8,244,681 B2
(45) Date of Patent: Aug. 14, 2012

(54) CREATING SYNTHETIC BACKUP IMAGES ON A REMOTE COMPUTER SYSTEM

(75) Inventor: Aaron Wallace Laffin, Richfield, MN (US)

(73) Assignee: Symantec Operating Corporation, Mountain View, CA (US)

( * ) Notice: Subject to any disclaimer, the term of this patent is extended or adjusted under 35 U.S.C. 154(b) by 583 days.

(21) Appl. No.: 12/135,310

(22) Filed: Jun. 9, 2008

(65) Prior Publication Data

US 2009/0307286 A1     Dec. 10, 2009

(51) Int. Cl.
*G06F 17/30* (2006.01)
(52) U.S. Cl. ......................................... 707/644; 711/162
(58) Field of Classification Search .................. None
See application file for complete search history.

(56) References Cited

U.S. PATENT DOCUMENTS

| | | | |
|---|---|---|---|
| 6,460,055 B1 * | 10/2002 | Midgley et al. | 707/640 |
| 6,714,952 B2 * | 3/2004 | Dunham et al. | 707/645 |
| 7,103,740 B1 * | 9/2006 | Colgrove et al. | 711/162 |
| 7,197,520 B1 | 3/2007 | Matthews | |
| 7,251,749 B1 | 7/2007 | Fong | |
| 7,266,574 B1 | 9/2007 | Boudrie | |
| 7,266,655 B1 | 9/2007 | Escabi, II | |
| 7,284,104 B1 | 10/2007 | Wu | |
| 7,310,654 B2 | 12/2007 | McNeil | |
| 7,430,647 B2 * | 9/2008 | Sandorfi et al. | 711/162 |
| 7,465,154 B2 * | 12/2008 | Devore et al. | 416/97 R |
| 7,519,858 B2 | 4/2009 | Korlepara | |
| 7,536,424 B2 | 5/2009 | Barzilai | |
| 7,627,727 B1 | 12/2009 | Kekre | |
| 7,694,086 B1 | 4/2010 | Bezbaruah | |
| 7,743,022 B2 * | 6/2010 | Kaasten et al. | 707/612 |
| 7,756,833 B2 * | 7/2010 | Van Ingen et al. | 707/640 |
| 8,131,964 B2 * | 3/2012 | Retnamma et al. | 711/162 |
| 2004/0034752 A1 * | 2/2004 | Ohran | 711/161 |
| 2007/0156793 A1 * | 7/2007 | D'Souza et al. | 707/204 |
| 2009/0172322 A1 * | 7/2009 | Gilpin et al. | 711/162 |

* cited by examiner

*Primary Examiner* — Cheyne Ly
*Assistant Examiner* — Michelle Owyang
(74) *Attorney, Agent, or Firm* — Meyertons, Hood, Kivlin, Kowert & Goetzel, P.C.

(57) ABSTRACT

A local host computer system creates a full backup image and one or more incremental backup images. The local host computer system transmits data from the full backup image and the one or more incremental backup images to a remote host computer system. The remote host computer system receives the data from the full backup image and the one or more incremental backup images from the local host computer system, and creates a synthetic backup image using the data from the full backup image and the one or more incremental backup images. In some embodiments, complete copies of the full backup image and the one or more incremental backup images may be transmitted to the remote host computer system. In other embodiments only the portions of the incremental backup images that are actually needed to create the synthetic backup image may be transmitted to the remote host computer system, and unneeded portions may not be transmitted.

7 Claims, 6 Drawing Sheets

CREATING SYNTHETIC BACKUP IMAGES ON A REMOTE COMPUTER SYSTEM

BACKGROUND OF THE INVENTION

1. Field of the Invention

This invention relates to data backup software for computer systems. More particularly, the invention relates to a system and method for creating a synthetic backup image on a remote host computer system coupled to a local host computer system, e.g., where the synthetic backup image is created from a full backup image and one or more incremental backup images received from the local host computer system.

2. Description of the Related Art

Computer systems often employ backup solutions to backup data in order to protect it against hardware failure or data corruption. Data may be stored on a storage device or in a logical volume of the computer system in the form of files. Backup techniques for backing up the files generally operate to create a backup image. One general backup technique is to backup the files at the file level, e.g., to include the files in the backup image on a file-by-file basis. In this technique, all the data for a given file is typically stored in the backup image, followed by all the data for the next file, etc. Another general backup technique is to backup the backup the files at the storage device block level rather than on a file-by-file basis. In this technique, the blocks may be sequentially read from the disk drive or other storage device on which the volume is stored and written to the backup image.

The backup image may be used to restore the data to the computer system in the event that it becomes necessary to do so, e.g., if the storage device on which the data is stored fails, if the data becomes corrupted, or if a user or software application needs to access the data is it existed at the time the backup image was created.

Some backup solutions operate to create different types of backup images, such as full backup images and incremental backup images. A full backup image includes all the data of the storage device or volume that is being backed up. Thus, a full backup is a complete representation of the storage device or volume data as it exists at the time the full backup is created. An incremental backup image includes only the data that has changed since a previous backup image was created.

SUMMARY

Various embodiments of a system and method for creating a synthetic backup image from a full backup image and one or more incremental backup images are described herein. According to some embodiments of the method, a first computer system may be configured to create a full backup image and one or more incremental backup images. The first computer system may transmit data from the full backup image and the one or more incremental backup images to a second computer system. The second computer system may be configured to receive the data from the full backup image and the one or more incremental backup images from the first computer system, and create a synthetic backup image using the data from the full backup image and the one or more incremental backup images.

In some embodiments, transmitting the data from the full backup image and the one or more incremental backup images to the second computer system may comprise transmitting a complete copy of the full backup image and a complete copy of each of the one or more incremental backup images to the second computer system. The second computer system may be configured to store the complete copy of the full backup image and the complete copy of each of the one or more incremental backup images in a data store. The second computer system may create the synthetic backup image using the complete copy of the full backup image and the complete copy of each of the one or more incremental backup images.

In other embodiments, only a portion of one or more of the incremental backup images may be transmitted to the second computer system. For example, the one or more incremental backup images may include a particular incremental backup image, and only a portion of the particular incremental backup image may be transmitted to the second computer system, e.g., without transmitting a complete copy of the particular incremental backup image. In some embodiments the portion of the particular incremental backup image may be transmitted to the second computer system during creation of the synthetic backup image. For example, in some embodiments, only the portions of the incremental backup images that are actually needed to create the synthetic backup image may be transmitted to the second computer system, and unneeded portions may not be transmitted.

BRIEF DESCRIPTION OF THE DRAWINGS

A better understanding of the invention can be obtained when the following detailed description is considered in conjunction with the following drawings, in which.

Figure 1:
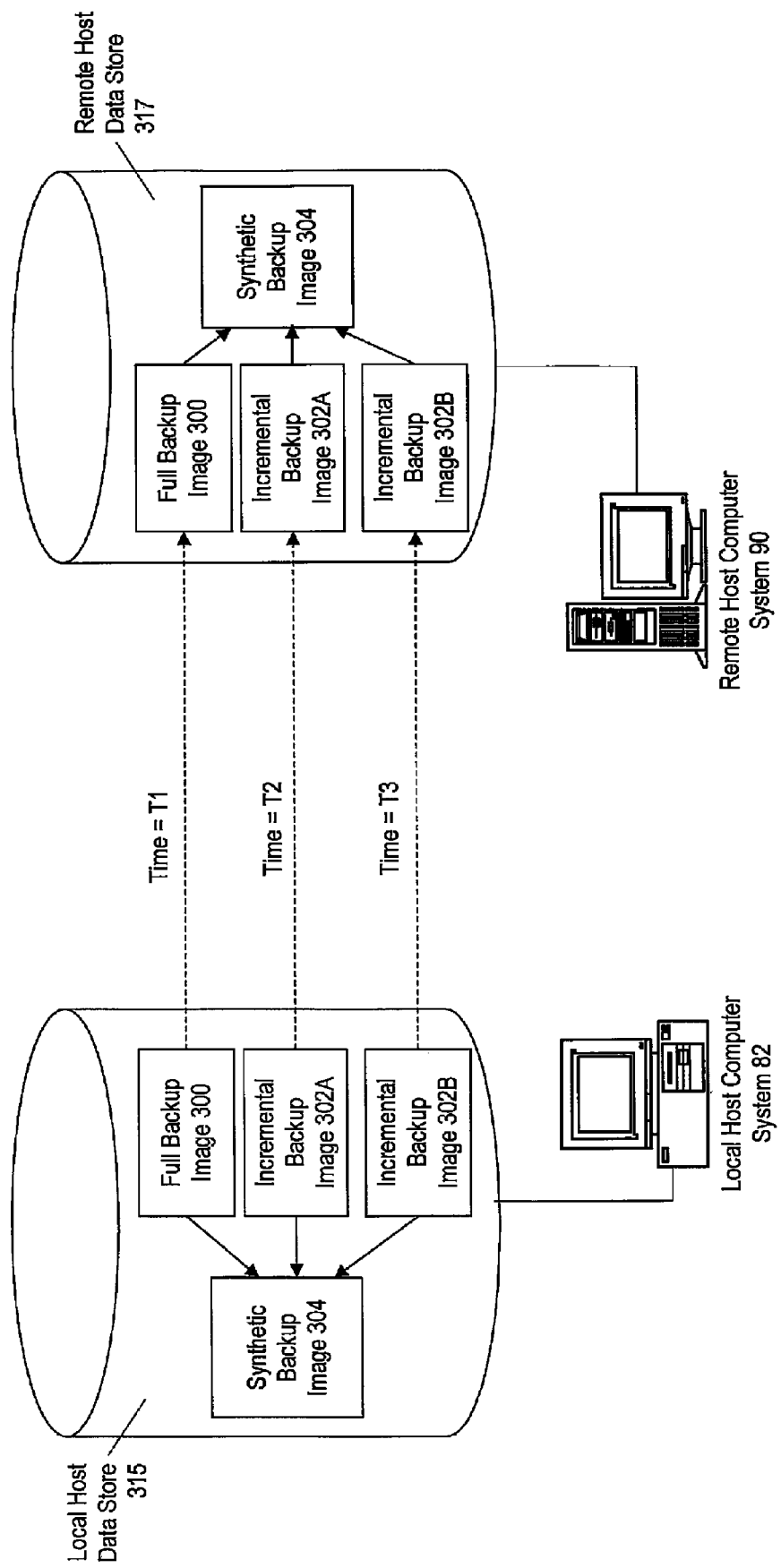
FIGS. 1-3 illustrate various embodiments of a system in which a local host computer system transmits data from a full backup image and one or more incremental backup images to a remote host computer system, and the remote host computer system creates a synthetic backup image using the data received from the local host computer system.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Various embodiments of a system and method for creating a synthetic backup image from a full backup image and one or more incremental backup images are described herein. FIG. 1 illustrates one embodiment of the system.

The system includes a local host computer system 82. The local host computer system 82 may execute backup software to periodically create backup images in order to backup data. In some embodiments the data that is backed up may be data that is stored on one or more storage devices included in or coupled to the local host computer system 82, such as one or more disk drive devices, optical storage devices, tape storage devices, flash memory storage devices, etc. In other embodiments the local host computer system 82 may receive the data from one or more client computers coupled to the local host computer system 82 and may create the backup images using the data. The local host computer system 82 may execute local host backup software 205 which creates the backup images.

The system also includes a remote host computer system 90. As described below, one or more of the backup images created by the local host computer system 82 may be transmitted to the remote host computer system 90. Thus, the term "local host computer system 82" refers to the computer system which creates the backup images transmitted to the remote host computer system 90. The remote host computer system 90 may be located remotely from the local host computer system 82 and may be coupled to the local host computer system 82 via a network.

In some embodiments the backup images created by the local host computer system 82 may be backup images of a volume, e.g., a volume of the local host computer system 82 or of a client computer coupled to the local host computer system 82. For example, the volume may be stored on one or more storage devices included in or coupled to the local host computer system 82 or a client computer. A volume represents a partitioning and/or aggregation of physical storage provided by one or more storage devices. A volume may be formed from a portion of the overall storage of a physical device, from the storage of an entire physical device, or from the storage of multiple physical storage devices combined.

As used herein, the term "backup image" refers to data created by backing up files from a computer system. The backup image may be created using various types of backup techniques, such as block-level backup techniques or file-by-file backup techniques. Thus, for example, the backup image may include an exact block-level image of the original volume from which the backup image was created, or each file that is backed up from the original volume may be stored in the backup image as a corresponding file.

The local host computer system 82 may be operable to create both full backup images and incremental backup images. A full backup image is a complete representation of the storage device data or volume data as it exists at the time the full backup image is created. Thus, a full backup image may include all of the data of the storage device or volume being backed up. A full backup image does not depend on any other backup image.

An incremental backup image is a backup image that depends on, or is relative to, another backup image, e.g., a backup image that represents the data that has changed since a previous backup image was created. An incremental backup image may depend on a full backup image (e.g., may represent the data changes that have occurred since the full backup image was created) or may depend on another incremental backup image (e.g., may represent the data changes that have occurred since the other incremental backup image was created).

An incremental backup image includes the data that has changed since the time when the (full or incremental) backup image on which it depends was created. The incremental backup image generally does not include the data that has not changed since the time when the backup image on which it depends was created. However, if for example, the incremental backup is performed on a per-file basis (e.g., instead of being performed at the block level) then in some embodiments the incremental backup image may include all of the data for each file that has changed since the backup image on which it depends was created, including both changed and unchanged portions of the file data. However, the incremental backup image typically would not include any files that have not changed since the backup image on which it depends was created.

In some embodiments the local host computer system 82 may be operable to create different types of incremental backup images, such as differential incremental backup images and cumulative incremental backup images. A differential incremental backup image represents the data that has changed since the last backup image of any type was created. Thus, a differential incremental backup image represents the data changes that have occurred since the last backup image was created, regardless of its type.

A cumulative incremental backup image may represent the data that has changed since the last full backup image was created. For example, one or more differential incremental backup images may have been created between the last full backup image and the cumulative incremental backup image, but the cumulative incremental backup image is not based on the last differential incremental backup image, but is instead based on the last full backup image and includes all the data that has changed since the last full backup image was created (but not the data that has not changed).

In some embodiments a cumulative incremental backup image may also be relative to another cumulative incremental backup image. For example, a first cumulative incremental backup image may be created which represents all the data that has changed since the last full backup image was created. Subsequently, a second cumulative incremental backup image may be created which represents all the data that has changed since the first cumulative incremental backup image was created, regardless of whether or not any differential incremental backup images have been created after the first cumulative incremental backup image.

Unless otherwise specified, the term "incremental backup image" may herein refer to any type of incremental backup image, including differential incremental backup images and cumulative incremental backup images.

The backup software on the local host computer system 82 may be configured to create the full backup images and incremental backup images according to a time schedule. As an example, the backup software may be configured to create a full backup image on each Monday of each week, and create differential incremental backup images on each of the other days of the week. In this example, the differential incremental backup image created on Tuesday includes the data that changed since the time when the full backup image was created on Monday. The differential incremental backup image created on Wednesday includes the data that changed since the time when the differential incremental backup image was created on Tuesday, and so on. Thus, each Monday a new full backup image may be created, and the cycle starts again. This is only an example of a backup schedule, and in various embodiments the local host computer system may be configured to create full backup images and various types of incremental backup images according to any desired schedule.

In some embodiments the backup images created by the local host computer system 82 may be stored in a local host data store 315 on the local host computer system 82. As used herein the term "data store" refers to any type of storage area, storage system, or data structure for storing data, such as a file system or database. For example, the local host data store 315 may be implemented on a different storage device of the local host computer system 82 than the storage device(s) where the original data is stored, and/or may be stored in a separate volume than the volume in which the original data is stored.

As described above, incremental backup images are not independent backup images. Instead, each incremental backup image depends on another backup image. For example, the first incremental backup image created after a full backup image depends on the full backup image. The second incremental backup image may depend on the first incremental backup image, and so on. In some systems it may be desirable to periodically consolidate or synthesize the incremental backup images into an independent and complete backup image, referred to herein as a synthetic backup image. A synthetic backup image is created from a full backup image and one or more incremental backup images and represents the data changes specified by the one or more incremental backup images, e.g., as applied to the original data specified by the full backup image. A synthetic backup image is similar to a full backup image in that it does not depend on any other backup image and completely represents all of the data of the storage device or volume in question. However, the synthetic backup image is not created directly by backing up the storage device or volume, but is instead synthesized from the full backup image and the one or more incremental backup images.

For example, FIG. 1 illustrates an example in which a full backup image 300 has been created at a time T1. A first incremental backup image 302A has been created at a time T2 subsequent to the time T1, and a second incremental backup image 302B has been created at a time T3 subsequent to the time T2. The first incremental backup image 302A is relative to the full backup image 300, and the second incremental backup image 302B is relative to the first incremental backup image 302A.

The full backup image 300 and the incremental backup images 302A and 302B are then combined into a synthetic backup image 304. The synthetic backup image 304 is a complete and independent representation of the storage device data or volume data as it existed at the time T3 when the incremental backup image 302B was created. In some embodiments the synthetic backup image 304 may be identical (or effectively identical) to a full backup image created at the time T3, i.e., a full backup image created directly by backing up all of the data at the time T3 instead of being synthesized from the other three backup images.

In addition to storing the backup images in the local host data store 315 in the local host computer system 82, in some systems it may be desirable to remotely store the backup images on the remote host computer system 90. Storing the backup images remotely on the remote host computer system 90 may provide increased data protection for the data.

The full backup image and the one or more incremental backup images created by the local host computer system 82 may be transmitted through a network to the remote host computer system 90. The remote host computer system 90 may receive these backup images and store them in a remote host data store 317. Thus, in the example of FIG. 1, the remote host data store 317 may include an identical copy of the full backup image 300 created by the local host computer system 82, as well as identical copies of the incremental backup images 302A and 302B.

In various embodiments the backup images may be transmitted to the remote host computer system 90 at various times relative to their creation on the local host computer system 82. In some embodiments, each backup image may be transmitted to the remote host computer system 90 at (or just after) the time it is created. Thus, in the example of FIG. 1, the full backup image 300 may be transmitted to the remote host computer system 90 at the time T1, and the incremental backup images 302A and 302B may be transmitted to the remote host computer system 90 at the time T2 and T3, respectively. Thus, in some embodiments the various backup images may be transmitted to the remote host computer system 90 separately from each other and at different times. In other embodiments one or more of the backup images may be transmitted to the remote host computer system 90 together with each other at the same time.

The remote host computer system 90 may be configured to create a synthetic backup image 304 from the copies of the backup images received from the local host computer system 82, e.g., from the full backup image 300 and the incremental backup images 302A and 302B in the example of FIG. 1. The synthetic backup image 304 created by the remote host computer system 90 may be identical to (or effectively identical to) the synthetic backup image 304 created by the local host computer system 82.

In various embodiments the ability of the remote host computer system 90 to create the synthetic backup image 304 may provide efficiency or performance advantages for the system. For example, without the ability for the remote host computer system 90 to create the synthetic backup image 304, it would be necessary to transmit the synthetic backup image 304 from the local host computer system 82 in order to store the synthetic backup image 304 on the remote host computer system 90. This transmission may be costly in terms of network communication.

Although the example of FIG. 1 illustrates a synthetic backup image being created from an original full backup image and two incremental backup images, in various embodiments any number of incremental backup images may be used to create the synthetic backup image. Also, in various embodiments the synthetic backup image may be created at any time with respect to the times at which the backup images are received from the local host computer system 82, or according to any desired time schedule. In some embodiments the synthetic backup image may be created as soon as the last incremental backup image needed for the creation of the synthetic backup image is received.

In some embodiments the remote host computer system 90 may be configured to delete one or more of the backup images used to create the synthetic backup image after the synthetic backup image has been created. For example, in the example of FIG. 1, the remote host computer system 90 may delete one or more of the full backup image 300 and/or the incremental backup images 302A and 302B after creating the synthetic backup image 304.

In some embodiments the synthetic backup image may be created on the remote host computer system 90 without storing complete copies of the incremental backup images on the remote host computer system 90 beforehand. Instead, the remote host computer system 90 may communicate with the local host computer system 82 to retrieve data from the incremental backup images as needed during the creation of the synthetic backup image. Only the portions of the incremental backup images that are actually needed to create the synthetic backup image may be transmitted to the remote host computer system 90, and unneeded portions may not be transmitted.

Figure 2:
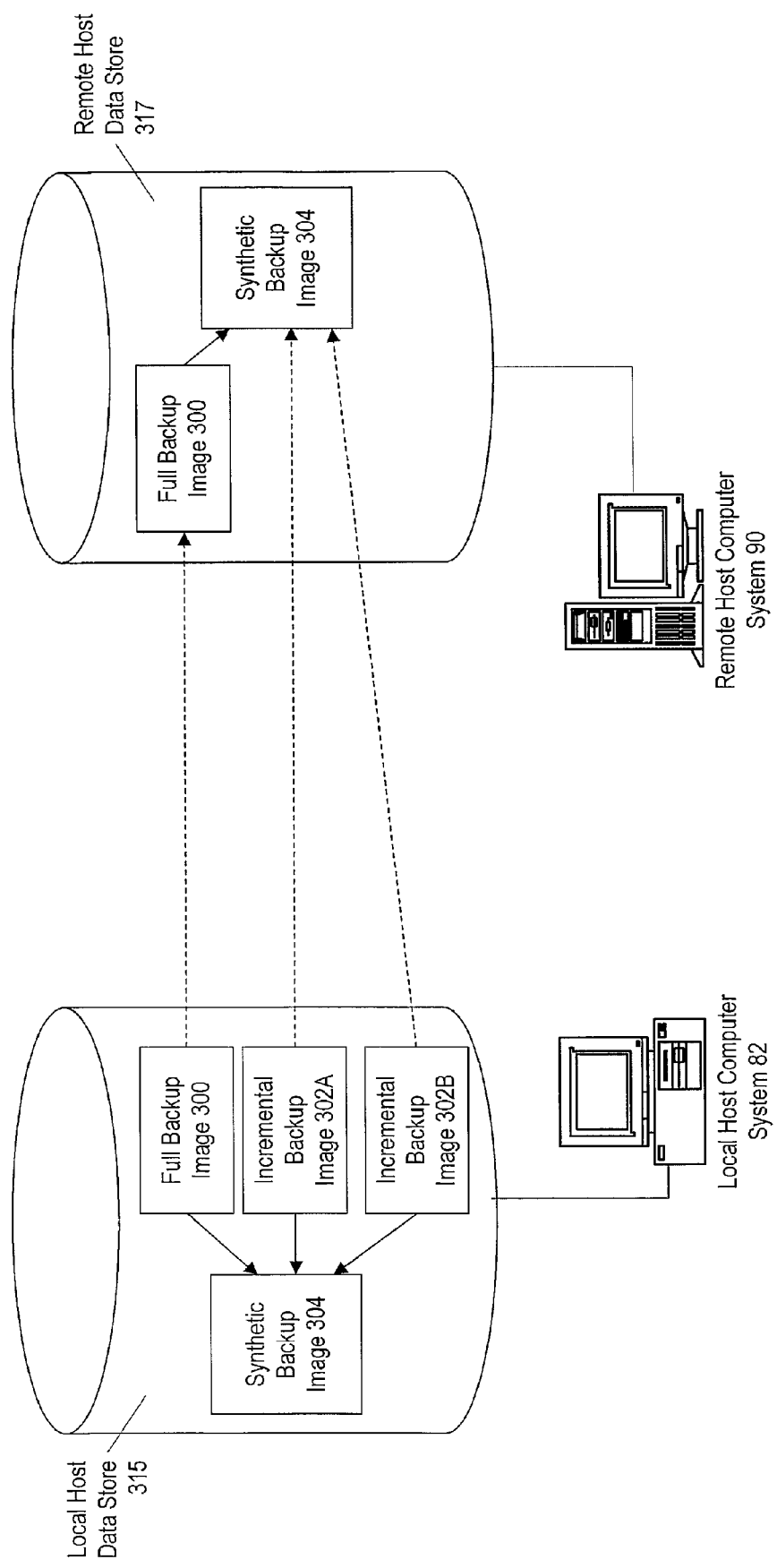

For example, FIG. 2 illustrates an example similar to FIG. 1. In this example, the local host computer system 82 transmits a complete copy of the full backup image 300 to the remote host computer system 90, where it is then stored in the remote host data store 317, similarly as in the example of FIG. 1. However, in this example, the local host computer system 82 does not transmit full copies of the incremental backup images 302A and 302B to the remote host computer system 90 before the synthetic backup image 304 is created. Instead, the remote host computer system 90 communicates with the local host computer system 82 during creation of the synthetic backup image 304 in order to retrieve only the data actually needed from the incremental backup images 302A and 302B in order to produce the synthetic backup image. This may reduce the total amount of data transmitted to the remote host computer system 90 since not all of the data in all of the incremental backup images may be needed to create the synthetic backup image.

Figure 3:
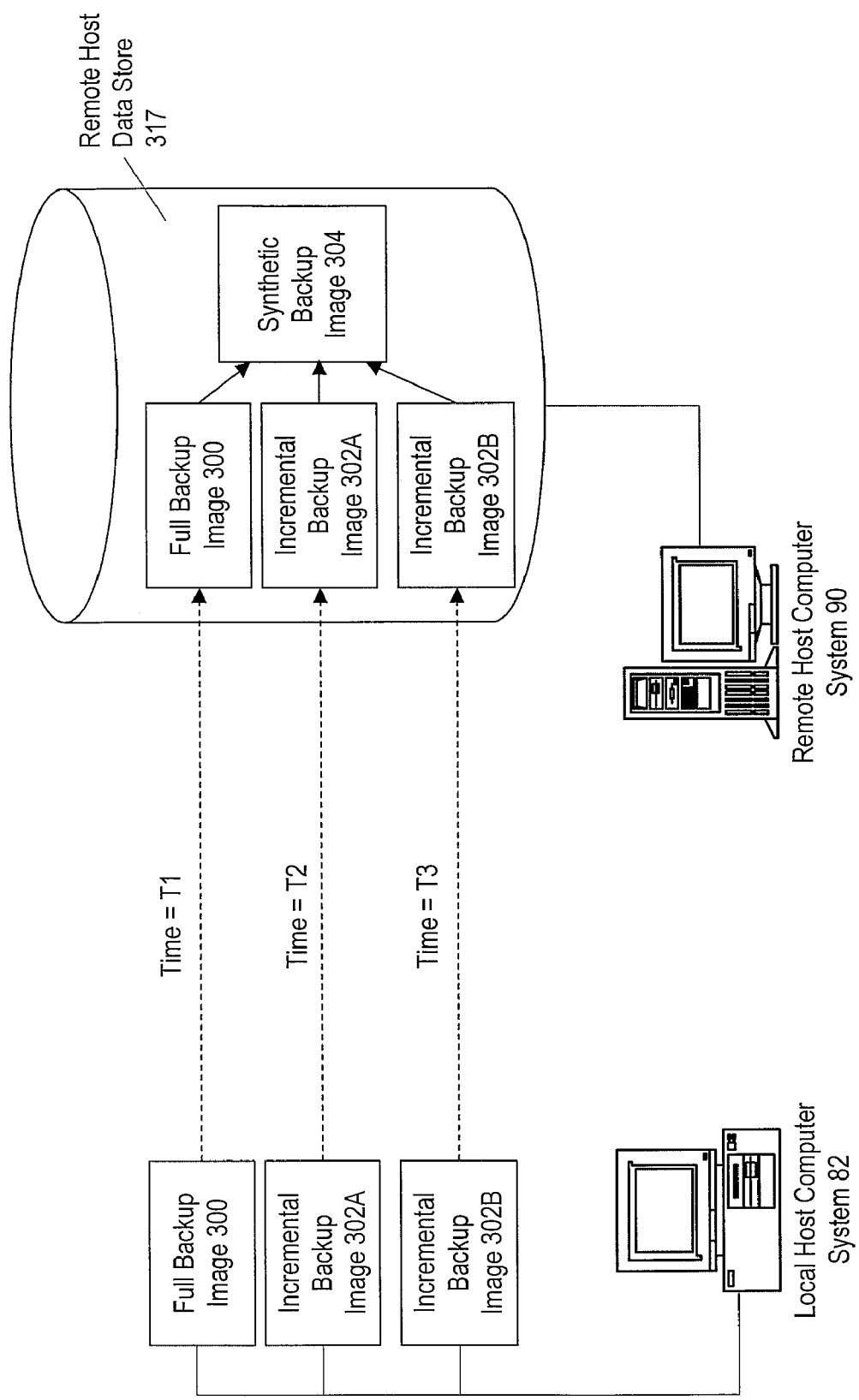

It is also noted that in some embodiments the backup images may not be stored in a local host data store 315 on the local host computer system 82. Instead, the local host computer system 82 may simply delete each backup image after transmitting it to the remote host computer system 90. FIG. 3 illustrates an example similar to FIG. 1. However, in this example, the full backup image 300 is deleted on the local host computer system 82 after being transmitted to the remote host computer system 90 at time T1. Similarly, the incremental backup images 302A and 302B are deleted on the local host computer system 82 after being transmitted to the remote host computer system 90 at times T2 and T3, respectively.

Figure 4:
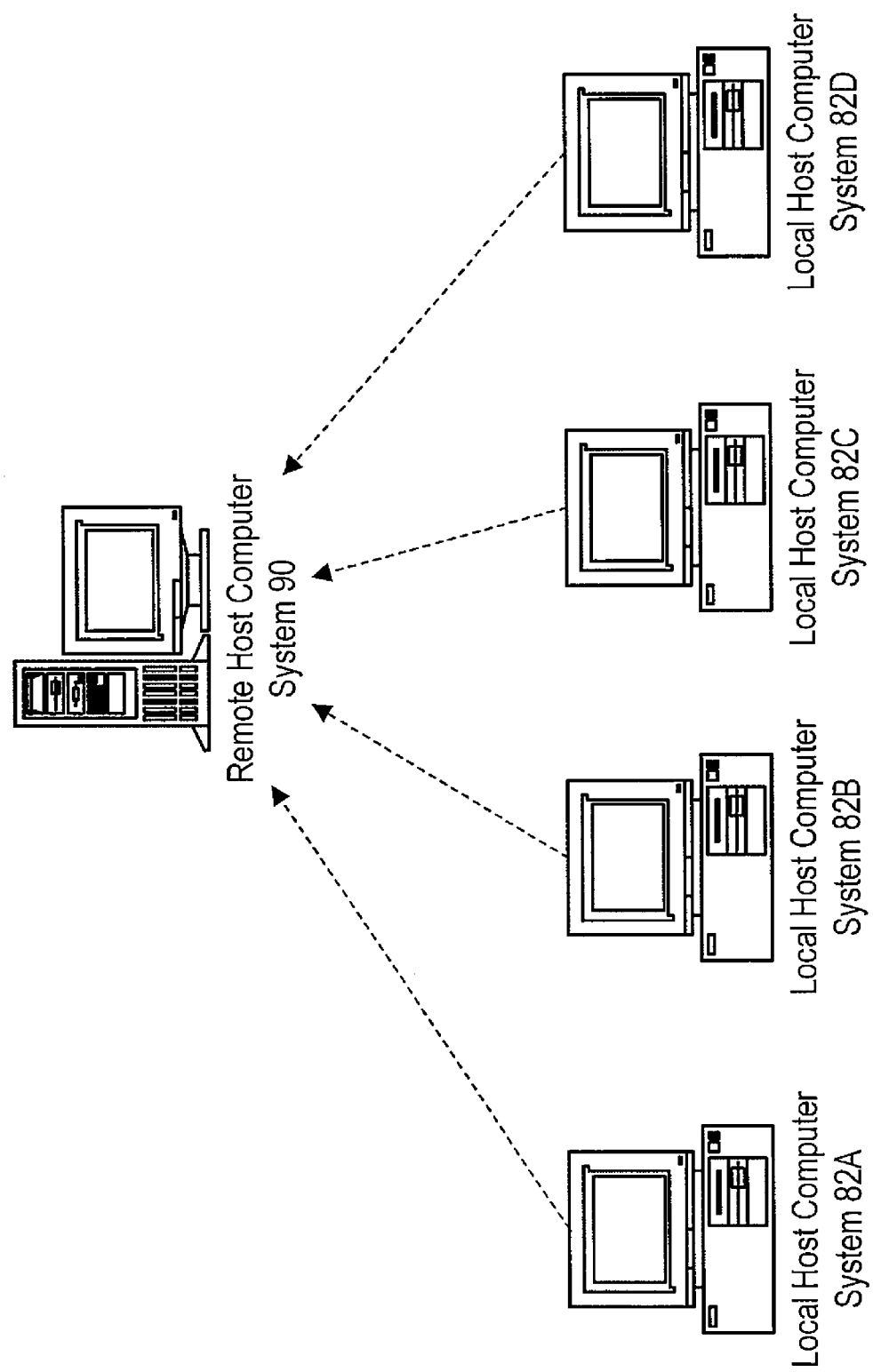
FIG. 4 illustrates an embodiment of the system where a plurality of local host computer systems are coupled to the remote host computer system, and the remote host computer system receives a respective set of backup images from each respective local host computer system.

In some embodiments the remote host computer system 90 may be configured to receive respective sets of backup images from different local host computer systems 82. For example, the remote host computer system 90 may implement a remote backup service that allows various local host computer systems 82 to remotely store their backup images. For example, FIG. 4 illustrates an example in which the remote host computer system 90 receives different sets of backup images from different local host computer systems 82A-82D. For each respective set of backup images received from a respective local host computer system 82, the remote host computer system 90 may create a respective synthetic backup image, similarly as described above.

Figure 5:
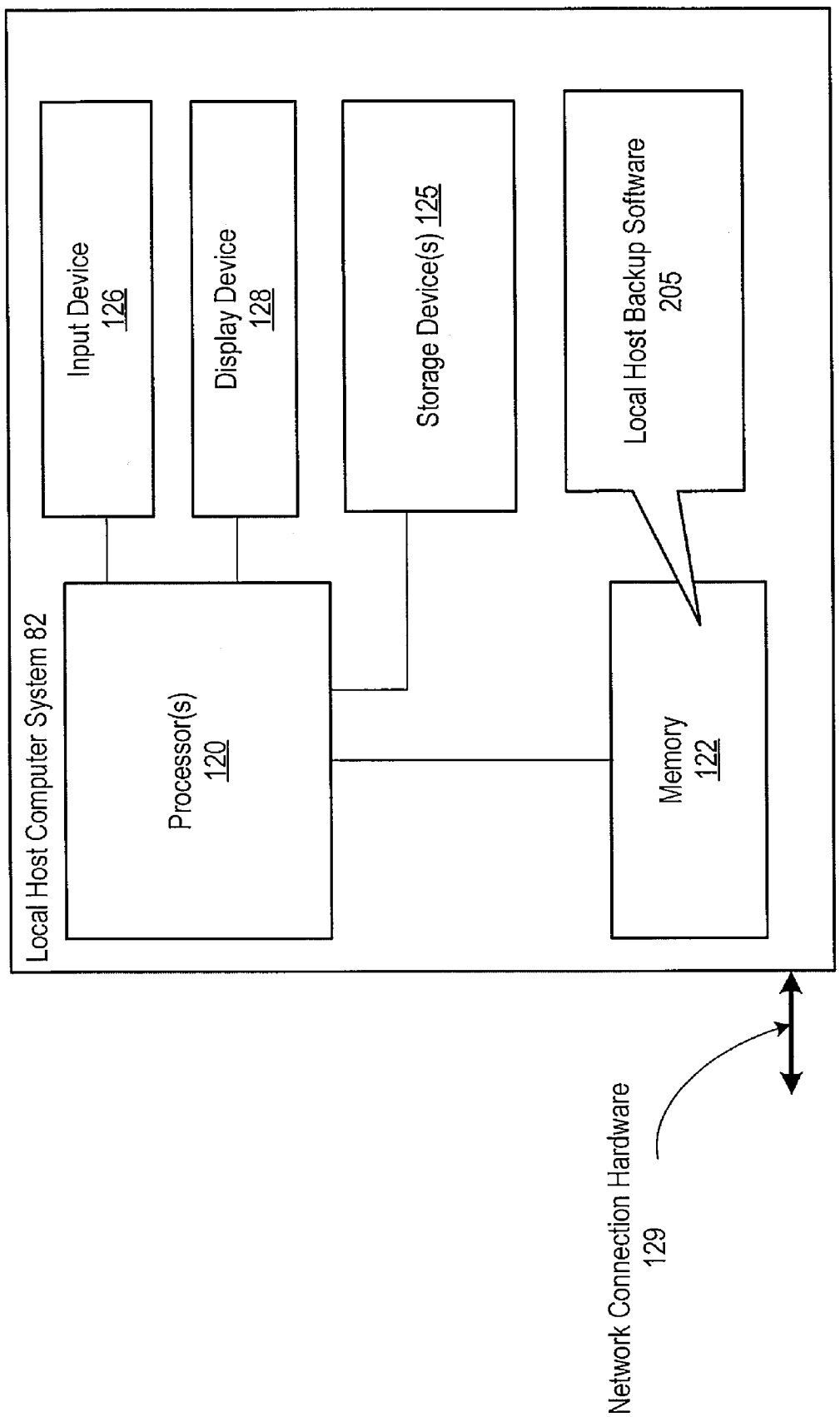
FIG. 5 illustrates an example of the local host computer system according to one embodiment.

It is noted that the local host computer system 82 and the remote host computer system 90 may include any type of computing devices or other hardware devices. FIG. 5 illustrates an example of the local host computer system 82 according to one embodiment. In this example, the local host computer system 82 includes a processor 120 coupled to memory 122. In some embodiments, the memory 122 may include one or more forms of random access memory (RAM) such as dynamic RAM (DRAM) or synchronous DRAM (SDRAM). However, in other embodiments, the memory 122 may include any other type of memory instead or in addition.

The memory 122 may be configured to store program instructions and/or data. In particular, the memory 122 may store local host backup software 205. The local host backup software 205 may be executable by the processor 120 to perform the functions described above with reference to the local host computer system 82, such as creating the full backup image and the incremental backup images and transmitting these backup images to the remote host computer system 90. The memory 122 may also store other software which operates in conjunction with or which is used by the local host backup software 205, such as operating system software, file system software, network communication software, device management software, etc.

In various embodiments the local host backup software 205 may be implemented in any of various ways and may have any desired software architecture. For example, in some embodiments the local host backup software 205 may be implemented as a single software program. In other embodiments the local host backup software 205 may be implemented as two or more software programs that operate in conjunction with each other.

Referring again to FIG. 5, it is noted that the processor 120 is representative of any type of processor. For example, in some embodiments, the processor 120 may be compatible with the x86 architecture, while in other embodiments the processor 120 may be compatible with the SPARC™ family of processors. Also, in some embodiments the local host computer system 82 may include multiple processors 120.

The local host computer system 82 may also include one or more storage devices 125, which in some embodiments store the data which is backed up in the backup images created by the local host backup software 205. (As noted above, in other embodiments the data may be received from one or more client computers coupled to the local host computer system 82.) The local host data store 315 may also be stored on the one or more storage devices 125. In various embodiments the storage devices 125 may include any of various kinds of storage devices, such as disk drive devices, optical storage devices, tape storage devices, flash memory storage devices, etc. In one embodiment, the storage devices 125 may be implemented as one or more hard disks configured as a disk storage system. In one embodiment, the disk storage system may be an example of a redundant array of inexpensive disks (RAID) system. In another embodiment, the disk storage system may be a disk array, or Just a Bunch Of Disks (JBOD), (used to refer to disks that are not configured according to RAID). In yet other embodiments, the storage devices 125 may include RAM disks, for example.

The local host computer system 82 may also include one or more input devices 126 for receiving user input from a user of the local host computer system 82. The input device(s) 126 may include any of various types of input devices, such as keyboards, keypads, microphones, or pointing devices (e.g., a mouse or trackball). The local host computer system 82 may also include one or more output devices 128 for displaying output to the user. The output device(s) 128 may include any of various types of output devices or display devices, such as LCD screens or monitors, CRT monitors, etc.

The local host computer system 82 may also include network connection hardware 129 through which the local host computer system 82 connects to a network, e.g., in order to transmit data to the remote host computer system 90. The network connection hardware 129 may include any type of hardware for coupling the local host computer system 82 to the network, e.g., depending on the type of network. In various embodiments, the local host computer system 82 may connect to the remote host computer system 90 through any type of network or combination of networks. For example, the network may include any type or combination of local area network (LAN), a wide area network (WAN), wireless networks, an Intranet, the Internet, etc. Examples of local area networks include Ethernet networks, Fiber Distributed Data Interface (FDDI) networks, and token ring networks. Also, the local host computer system 82 and the remote host computer system 90 may each be coupled to the network using any type of wired or wireless connection medium. For example, wired mediums may include Ethernet, fiber channel, a modem connected to plain old telephone service (POTS), etc. Wireless connection mediums may include a wireless connection using a wireless communication protocol such as IEEE 802.11 (wireless Ethernet), a modem link through a cellular service, a satellite link, etc.

Figure 6:
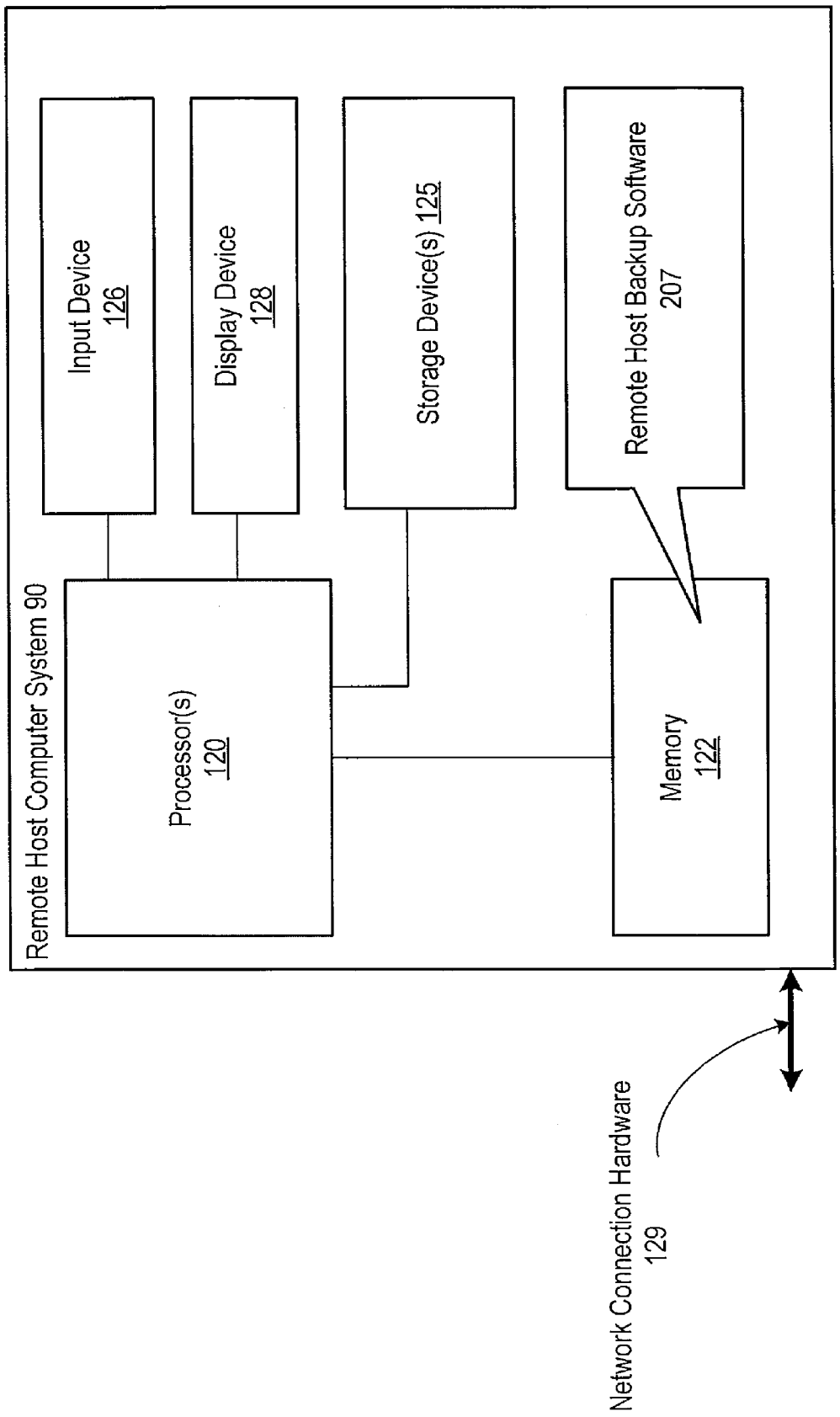
FIG. 6 illustrates an example of the remote host computer system according to one embodiment.

FIG. 6 illustrates an example of the remote host computer system 90 according to one embodiment. The remote host computer system 90 includes similar components as those described above with reference to FIG. 5. However, in this case the memory 122 stores remote host backup software 207. The remote host backup software 207 may be executable by the processor(s) 120 to perform the functions described above with reference to the remote host computer system 90, such as storing the full backup image and the one or more incremental backup images in the remote host data store 317 in response to receiving them from the local host computer system 82, as well as creating the synthetic backup image from these backup images. The memory 122 may also store other software which operates in conjunction with or which is used by the remote host backup software 207, such as operating system software, file system software, network communication software, device management software, etc.

In various embodiments the remote host backup software 207 may be implemented in any of various ways and may have any desired software architecture. For example, in some embodiments the remote host backup software 207 may be implemented as a single software program. In other embodiments the remote host backup software 207 may be implemented as two or more software programs that operate in conjunction with each other.

The remote host data store 317 may be stored on one or more of the storage devices 125 of the remote host computer system 90. Similarly as described above, the storage devices 125 may include any of various kinds of storage devices, such as disk drive devices, optical storage devices, tape storage devices, flash memory storage devices, etc.

It is noted that various embodiments may further include receiving, sending or storing instructions and/or data implemented in accordance with the foregoing description upon a computer-accessible storage medium. Generally speaking, a computer-accessible storage medium may include any storage media accessible by one or more computers during use to provide instructions and/or data to the computer(s). For example, a computer-accessible storage medium may include storage media such as magnetic or optical media, e.g., one or more disks (fixed or removable), tape, CD-ROM, DVD-ROM, CD-R, CD-RW, DVD-R, DVD-RW, etc. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. In some embodiments the computer(s) may access the storage media via a communication means such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
a first backup computer system;
a second backup computer system; and
a third backup computer system, wherein the first backup computer system and the second backup computer system are both coupled to the third backup computer system;
wherein the first backup computer system is configured to:
create a full backup image of a first data volume stored on a first client computer system coupled to the first backup computer system, wherein the full backup image of the first data volume includes backup data received from the first client computer system;
create a plurality of incremental backup images of the first data volume stored on the first client computer system, wherein each of the incremental backup images of the first data volume includes backup data received from the first client computer system;
create a first synthetic backup image from the full backup image of the first data volume and the plurality of incremental backup images of the first data volume;
wherein the second backup computer system is configured to:
create a full backup image of a second data volume stored on a second client computer system coupled to the second backup computer system, wherein the full backup image of the second data volume includes backup data received from the second client computer system;
create a plurality of incremental backup images of the second data volume stored on the second client computer system, wherein each of the incremental backup images of the second data volume includes backup data received from the second client computer system;
create a second synthetic backup image from the full backup image of the second data volume and the plurality of incremental backup images of the second data volume;
wherein the third backup computer system is configured to:
create a third synthetic backup image from the full backup image of the first data volume and the plurality of incremental backup images of the first data volume, wherein the third backup computer system is configured to initiate creation of the third synthetic backup image after copying the full backup image of the first data volume from the first backup computer system and without first copying the plurality of incremental backup images of the first data volume from the first backup computer system, wherein the plurality of incremental backup images includes a first incremental backup image that includes first data needed for creating the third synthetic backup image and second data not needed for creating the third synthetic backup image, wherein the third backup computer system is configured to communicate with the first backup computer system via a network during the creation of the third synthetic backup image to retrieve the first data from the first incremental backup image without retrieving the second data from the incremental backup image; and
create a fourth synthetic backup image from the full backup image of the second data volume and the plurality of incremental backup images of the second data volume.

2. The system of claim 1,
wherein, after creating the synthetic backup image, the second backup computer system is further configured to delete the data used from the full backup image and the data used from the plurality of incremental backup images.

3. The system of claim 1,
wherein the third backup computer system includes a storage device;
wherein the third backup computer system is further configured to store the third synthetic backup image on the storage device.

4. A method comprising:
a first backup computer system creating a full backup image of a first data volume stored on a first client computer system coupled to the first backup computer system, wherein the full backup image of the first data volume includes backup data received from the first client computer system;

the first backup computer system creating a plurality of incremental backup images of the first data volume stored on the first client computer system, wherein each of the incremental backup images of the first data volume includes backup data received from the first client computer system;

the first backup computer system creating a first synthetic backup image from the full backup image of the first data volume and the plurality of incremental backup images of the first data volume;

a second backup computer system creating a full backup image of a second data volume stored on a second client computer system coupled to the second backup computer system, wherein the full backup image of the second data volume includes backup data received from the second client computer system;

the second backup computer system creating a plurality of incremental backup images of the second data volume stored on the second client computer system, wherein each of the incremental backup images of the second data volume includes backup data received from the second client computer system;

the second backup computer system creating a second synthetic backup image from the full backup image of the second data volume and the plurality of incremental backup images of the second data volume;

wherein the first backup computer system and the second backup computer system are both coupled to a third backup computer system wherein the method further comprises:

the third backup computer system creating a third synthetic backup image from the full backup image of the first data volume and the plurality of incremental backup images of the first data volume, wherein the third backup computer system initiates creation of the third synthetic backup image after copying the full backup image of the first data volume from the first backup computer system and without first copying the plurality of incremental backup images of the first data volume from the first backup computer system, wherein the plurality of incremental backup images includes a first incremental backup image that includes first data needed for creating the third synthetic backup image and second data not needed for creating the third synthetic backup image, wherein the third backup computer system communicates with the first backup computer system via a network during the creation of the third synthetic backup image to retrieve the first data from the first incremental backup image without retrieving the second data from the incremental backup image; and the third backup computer system creating a fourth synthetic backup image from the full backup image of the second data volume and the plurality of incremental backup images of the second data volume.

5. The method of claim 4, further comprising:
after creating the synthetic backup image, the second backup computer system deleting the data used from the full backup image and the data used from the plurality of incremental backup images.

6. The method of claim 4, further comprising:
the third backup computer system storing the third synthetic backup image on a storage device.

7. A non-transitory computer-accessible storage medium storing program instructions executable by a first backup computer system, a second backup computer system, and a third backup computer system coupled to the first backup computer system and the second backup computer system to implement:

the first backup computer system creating a full backup image of a first data volume stored on a first client computer system coupled to the first backup computer system, wherein the full backup image of the first data volume includes backup data received from the first client computer system;

the first backup computer system creating a plurality of incremental backup images of the first data volume stored on the first client computer system, wherein each of the incremental backup images of the first data volume includes backup data received from the first client computer system;

the first backup computer system creating a first synthetic backup image from the full backup image of the first data volume and the plurality of incremental backup images of the first data volume; and the second backup computer system creating a full backup image of a second data volume stored on a second client computer system coupled to the second backup computer system, wherein the full backup image of the second data volume includes backup data received from the second client computer system;

the second backup computer system creating a plurality of incremental backup images of the second data volume stored on the second client computer system, wherein each of the incremental backup images of the second data volume includes backup data received from the second client computer system;

the second backup computer system creating a second synthetic backup image from the full backup image of the second data volume and the plurality of incremental backup images of the second data volume;

the third backup computer system creating a third synthetic backup image from the full backup image of the first data volume and the plurality of incremental backup images of the first data volume, wherein the third backup computer system initiates creation of the third synthetic backup image after copying the full backup image of the first data volume from the first backup computer system and without first copying the plurality of incremental backup images of the first data volume from the first backup computer system, wherein the plurality of incremental backup images includes a first incremental backup image that includes first data needed for creating the third synthetic backup image and second data not needed for creating the third synthetic backup image, wherein the program instructions are executable to cause the third backup computer system to communicate with the first backup computer system via a network during the creation of the third synthetic backup image to retrieve the first data from the first incremental backup image without retrieving the second data from the incremental backup image; and the third backup computer system creating a fourth synthetic backup image from the full backup image of the second data volume and the plurality of incremental backup images of the second data volume.

* * * * *